United States Patent
Swoboda

(10) Patent No.: US 7,404,106 B2
(45) Date of Patent: Jul. 22, 2008

(54) APPARATUS AND METHOD FOR REPORTING PROGRAM HALTS IN AN UNPROTECTED PIPELINE AT NON-INTERRUPTIBLE POINTS IN CODE EXECUTION

(75) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 81 days.

(21) Appl. No.: 10/729,591

(22) Filed: Dec. 5, 2003

(65) Prior Publication Data

US 2004/0148550 A1    Jul. 29, 2004

Related U.S. Application Data

(60) Provisional application No. 60/434,175, filed on Dec. 17, 2002.

(51) Int. Cl.
*G06F 11/00* (2006.01)
(52) U.S. Cl. .................. 714/30; 714/34; 712/227; 717/124
(58) Field of Classification Search .................. 714/34, 714/30; 712/227; 717/124
See application file for complete search history.

(56) References Cited

U.S. PATENT DOCUMENTS

| | | | | |
|---|---|---|---|---|
| 5,970,241 A | * | 10/1999 | Deao et al. | 712/227 |
| 6,112,298 A | * | 8/2000 | Deao et al. | 712/227 |
| 6,598,150 B2 | * | 7/2003 | Williams et al. | 712/227 |
| 6,981,178 B2 | * | 12/2005 | Nardini et al. | 714/34 |

* cited by examiner

*Primary Examiner*—Yolanda L. Wilson
(74) *Attorney, Agent, or Firm*—William W. Holloway; W. James Brady; Frederick J. Telecky, Jr.

(57) ABSTRACT

In a target processor having a non-protected pipeline, the execution code is typically provided with interruptible code portions and with non-interruptible code portions. The non-interruptible code portions prevent implementation of a real time interrupt that would corrupt the code so that execution could not be resumed. A storage unit is provided that stores a signal permitting a code execution halt even during a non-interruptible code portion. In this manner, a program developer can determine the status of the processor at any point in the code execution. When the execution halt is initiated during a non-interruptible code segment, a bit is set in a bit position of a memory-mapped register. This bit position can be transferred from the target processor to the host processing unit during a transfer of status data.

11 Claims, 2 Drawing Sheets

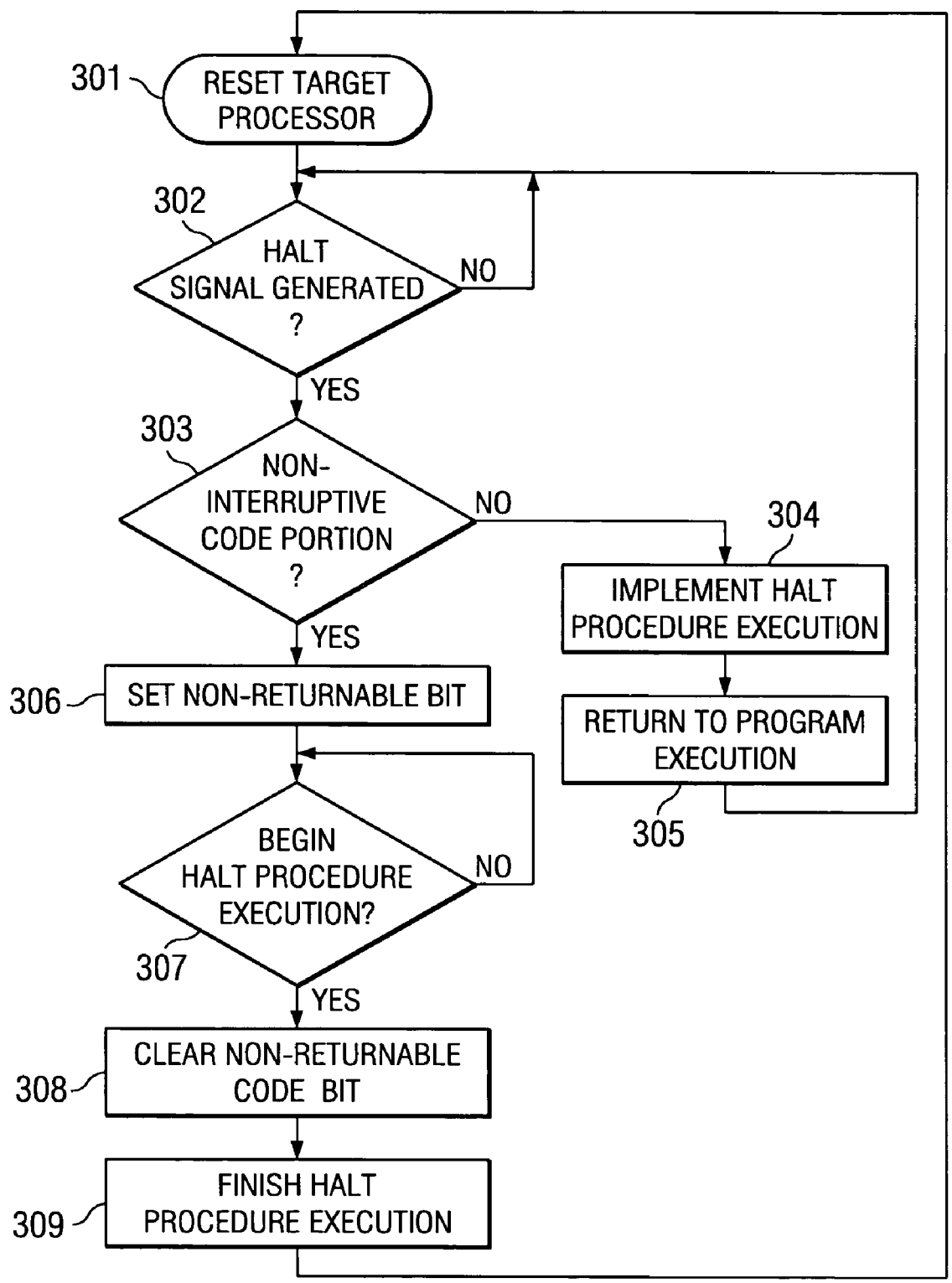

APPARATUS AND METHOD FOR REPORTING PROGRAM HALTS IN AN UNPROTECTED PIPELINE AT NON-INTERRUPTIBLE POINTS IN CODE EXECUTION

This application claims priority under 35 USC §119(e)(1) of Provisional Application No. 60/434,175 (TI-34658P) filed Dec. 17, 2002.

RELATED APPLICATIONS

U.S. patent application Ser. No. 10/728,627, entitled APPARATUS AND METHOD FOR SYNCHRONIZATION OF TRACE STREAMS FROM MULTIPLE PROCESSING UNITS, invented by Gary L. Swoboda, filed on even date herewith, and assigned to the assignee of the present application; U.S. patent application Ser. No. 10/729,212, entitled APPARATUS AND METHOD FOR SEPARATING DETECTION AND ASSERTION OF A TRIGGER EVENT, invented by Gary L. Swoboda, filed on even date herewith, and assigned to the assignee of the present application; U.S. patent application Ser. No. 10/729,239, entitled APPARATUS AND METHOD FOR STATE SELECTABLE TRACE STREAM GENERATION, invented by Gary L. Swoboda, filed on even date herewith, and assigned to the assignee of the present application; U.S. patent application Ser. No. 10/729,650, entitled APPARATUS AND METHOD FOR SELECTING PROGRAM HALTS IN AN UNPROTECTED PIPELINE AT NON-INTERRUPTIBLE POINTS IN CODE EXECUTION, invented by Gary L. Swoboda, filed on even date herewith, and assigned to the assignee of the present application; U.S. patent application Ser. No. 10/729,407, entitled APPARATUS AND METHOD FOR A FLUSH PROCEDURE IN AN INTERRUPTED TRACE STREAM, invented by Gary L. Swoboda, filed on even date herewith, and assigned to the assignee of the present application; U.S. patent application Ser. No. 10/729,564, entitled APPARATUS AND METHOD FOR CAPTURING AN EVENT OR COMBINATION OF EVENTS RESULTING IN A TRIGGER SIGNAL IN A TARGET PROCESSOR, invented by Gary L. Swoboda, filed on even date herewith, and assigned to the assignee of the present application; U.S. patent application Ser. No. 10/729,400, entitled APPARATUS AND METHOD FOR CAPTURING THE PROGRAM COUNTER ADDRESS ASSOCIATED WITH A TRIGGER SIGNAL IN A TARGET PROCESSOR, invented by Gary L. Swoboda, filed on even date herewith, and assigned to the assignee of the present application; U.S. patent application Ser. No. 10/729,592, entitled APPARATUS AND METHOD DETECTING ADDRESS CHARACTERISTICS FOR USE WITH A TRIGGER GENERATION UNIT IN A TARGET PROCESSOR, invented by Gary L. Swoboda and Jason L. Peck, filed on even date herewith, and assigned to the assignee of the present application U.S. patent application Ser. No. 10/729,639, entitled APPARATUS AND METHOD FOR TRACE STREAM IDENTIFICATION OF A PROCESSOR RESET, invented by Gary L. Swoboda and Bryan Thome, filed on even date herewith, and assigned to the assignee of the present application; U.S. patent application Ser. No. 10/729,214, entitled APPARATUS AND METHOD FOR TRACE STREAM IDENTIFICATION OF A PROCESSOR DEBUG HALT, invented by Gary L. Swoboda, Bryan Thome, Lewis Nardini, and Manisha Agarwala, filed on even date herewith, and assigned to the assignee of the present application; U.S. patent application Ser. No. 10/729,327, entitled APPARATUS AND METHOD FOR TRACE STREAM IDENTIFICATION OF A PIPELINE FLATTENER PRIMARY CODE FLUSH FOLLOWING INITIATION OF AN INTERRUPT SERVICE ROUTINE; invented by Gary L. Swoboda and Bryan Thome, filed on even date herewith, and assigned to the assignee of the present application; U.S. patent application Ser. No. 10/729,647, entitled APPARATUS AND METHOD FOR TRACE STREAM IDENTIFICATION OF A PIPELINE FLATTENER SECONDARY CODE FLUSH FOLLOWING A RETURN TO PRIMARY CODE EXECUTION, invented by Gary L. Swoboda and Bryan Thome, filed on even date herewith, and assigned to the assignee of the present application; U.S. patent application Ser. No. 10/729,401, entitled APPARATUS AND METHOD IDENTIFICATION OF A PRIMARY CODE START SYNC POINT FOLLOWING A RETURN TO PRIMARY CODE EXECUTION, invented by Gary L. Swoboda, filed on even date herewith, and assigned to the assignee of the present application; U.S. patent application Ser. No. 10/729,326, entitled APPARATUS AND METHOD FOR IDENTIFICATION OF A NEW SECONDARY CODE START POINT FOLLOWING A RETURN FROM A SECONDARY CODE EXECUTION, invented by Gary L. Swoboda, filed on even date herewith, and assigned to the assignee of the present application; U.S. patent application Ser. No. 10/729,190, entitled APPARATUS AND METHOD FOR TRACE STREAM IDENTIFICATION OF A PAUSE POINT IN A CODE EXECTION SEQUENCE, invented by Gary L. Swoboda, filed on even date herewith, and assigned to the assignee of the present application; U.S. patent application Ser. No. 10/729,196, entitled APPARATUS AND METHOD FOR COMPRESSION OF A TIMING TRACE STREAM, invented by Gary L. Swoboda and Bryan Thome, filed on even date herewith, and assigned to the assignee of the present application; U.S. patent application Ser. No. 10/729,272, entitled APPARATUS AND METHOD FOR TRACE STREAM IDENTIFCATION OF MULTIPLE TARGET PROCESSOR EVENTS, invented by Gary L. Swoboda and Bryan Thome, filed on even date herewith, and assigned to the assignee of the present application; and U.S. patent application Ser. No. 10/729,191, entitled APPARATUS AND METHOD FOR OP CODE EXTENSION IN PACKET GROUPS TRANSMITTED IN TRACE STREAMS, invented by Gary L. Swoboda and Bryan Thome, filed on even date herewith, and assigned to the assignee of the present application are related applications.

BACKGROUND OF THE INVENTION

1. Field of the Invention

This invention relates generally to the testing of digital signal processing units and, more particularly, to the interruption of code execution to determine the status of various portions of the target processor implementing the code or initiate a new procedure. A processor can have a protected pipeline or a non-protected pipeline. When the target processor has a non-protected pipeline, the code executing on the processor can have interruptible portions and can have non-interruptible portions.

2. Description of the Related Art

As microprocessors and digital signal processors have become increasingly complex, advanced techniques have been developed to test these devices. Dedicated apparatus is available to implement the advanced techniques. Referring to FIG. 1A, a general configuration for the test and debug of a target processor 12 is shown. The test and debug procedures operate under control of a host processing unit 10. The host processing unit 10 applies control signals to the emulation unit 11 and receives (test) data signals from the emulation unit 11 by cable connector 14. The emulation unit 11 applies control signals to and receives (test) signals from the target processor 12 by connector cable 15. The emulation unit 11 can be thought of as an interface unit between the host processing unit 10 and the target processor 12. The emulation unit 11 must process the control signals from the host processor unit 10 and apply these signals to the target processor 12 in such a manner that the target processor will respond with the appropriate test signals. The test signals from the target processor 12 can be a variety types. Two of the most popular test signal types are the JTAG (Joint Test Action Group) signals and trace signals. The JTAG signal provides a standardized test procedure in wide use. Trace signals are series of signals from a multiplicity of junctions in the target processor 12. While the width of the bus interfacing to the host processing unit 10 generally have a standardized width, the bus between the emulation unit 11 and the target processor 12 can be increased to accommodate the increasing complexity of the target processing unit 12. Thus, part of the interface function between the host processing unit 10 and the target processor 12 is to store the test signals until the signals can be transmitted to the host processing unit 10.

In the test and debug of the target processor, specified internal events result in a halt of the target processor (i.e., for analysis of the configuration of the processor) or in a change of processor program execution. These specified events are monitored by dedicated apparatus. Upon detection of the occurrence of the event, the monitoring apparatus generates an event signal. The events signal or signals are applied to a trigger device. The trigger device issues a trigger signal that results in the change of operation of the target processor. Referring to FIG. 1B, the operation of the trigger generation unit 19 is shown. Monitoring apparatus 18, including event signal generation units 181 through 18N, is typically included in the target processor 12. The event generation units 181–18N each monitors some portion of the target processor to determine when a specified condition (or conditions) or event is present. When the specified condition is detected by the event signal generation unit monitoring the condition, an event signal is generated. The event signals are applied to the trigger generation unit 19. Based on the event signals applied to the trigger generation unit 19, a trigger signal is selected. Certain events and combination of events, referred to as an event front, generate a selected trigger signal that results in certain activity in the target processor, e.g. a debug halt. Combinations of different events generating trigger signals are referred to as jobs. Multiple jobs can result in the same trigger signal or combination of trigger signals. In the test and debug of the target processor, the trigger signals can provide impetus for changing state in the target processor or for performing a specified activity. The event front defines the reason for the generation of trigger signal. This information is important in understanding the operation of the target processor because, as pointed out above, several combinations of events can result in the generation of a trigger signal. In order to analyze the operation of the target processing unit, the portion of the event front resulting in the trigger signal must be identified in order to determine the reason for the generation of the trigger signal.

A development system can create a number of test and debug events. These test and debug events halt the code execution so that analysis can be made of the state of the processor. In a real-time test and debug environment, it is desirable to allow the service of interrupt signals designated as real time interrupts to continue after a debug event generates an execution halt. Because the test and debug events are generally accepted at the next instruction boundary, a test and debug event can halt the code execution at a non-interruptible point in the code execution.

In a protected pipeline, real-time interrupt procedures can occur at any instruction boundary, so it is not a problem that code execution halts in a non-interruptible point. Once the code execution is halted, real-time interrupt procedures continue even though the code was not interruptible at the point at which the code execution was halted. In other words, in a non-interruptible code portion, real time interrupt procedures can continue in a protected pipeline independent of whether code execution is halted at a non-interruptible point.

In an unprotected pipeline, the situation is much different than for a protected pipeline. In the unprotected pipeline, real time interrupts cannot occur at any arbitrary instruction boundary because of architectural problems (e.g., delayed branches in flight) or instruction-to-instruction relationships that can be disturbed (the global enable bit is disabled to indicate these code areas). Because the pipeline sequence must be preserved in an unprotected pipeline, this rule is obeyed when code execution is halted by a test and debug event.

When a test and debug event is allowed to halt code execution in an unprotected pipeline at a non-interruptible point in the code execution, real time interrupt services must be blocked because these activities would corrupt the code so that the code execution could not be resumed after the interrupt return. To preserve the ability to service real-time interrupts after code execution halts, test and debug events must be blocked until code execution reaches an interruptible point.

However, an application developer may find it desirable to halt the code execution at a non-interruptible point in the code to observe the machine state even though real-time interrupt are blocked, and other times, may find it desirable to delay code execution halts to points where the code is interruptible (i.e., allowing service of real time interrupts after execution halts). Having once determined that the halt is desirable even if non-interruptible code is being executed, the user/host processor unit must be alerted to the corruption of the procedure executing at the time of the code halt.

A need has therefore been felt for apparatus and an associated method having the feature that a program execution halt taken in a non-protected pipeline during a non-interruptible portion of the code identified. It would be another feature of the apparatus and associated method to permit the user/host processing unit to determine whether a program execution halt is implemented during a non-interruptible portion of program executing on a non-protected pipeline. It would be further feature of the apparatus and associated method to permit the implementation of a code halt during a non-interruptible code portion to be communicated to user/host processing unit.

SUMMARY OF THE INVENTION

The aforementioned and other features are accomplished, according to the present invention, by providing a storage unit for storing a signal indicating that the program execution halt can be implemented in an unprotected pipeline whether the code is interruptible or non-interruptible. When the signal is present in the storage unit, a halt request will be forwarded immediately thereby resulting in a code execution halt. When the signal is not present in the storage unit, the halt request signal will be forwarded only during an interruptible portion of the code execution. The signal can be stored in the storage unit by the program or by the intervention through the test and debug facilities. When a halt signal is generated during non-interruptible portion of the code, a non-returnable bit is set in a memory-mapped register. During the transfer of status information from the target processor to the host processing unit, the non-returnable bit indicates that the code execution halt has corrupted the then-currently executing process.

Other features and advantages of present invention will be more clearly understood upon reading of the following description and the accompanying drawings and the claims.

BRIEF DESCRIPTION OF THE DRAWINGS

FIG. 1A is a block diagram of the apparatus used in the test and debug of a target processor; while

FIG. 3 is flow chart illustrating the reporting of code execution halt during a non-interruptible portion according to the present invention.

DESCRIPTION OF THE PREFERRED EMBODIMENT

1. Detailed Description of the Figures

Figure 1A:
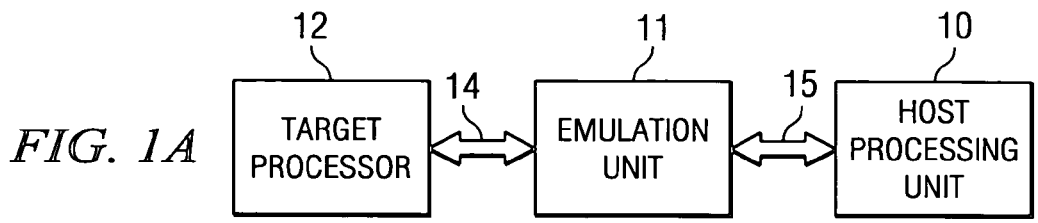
Figure 1B:
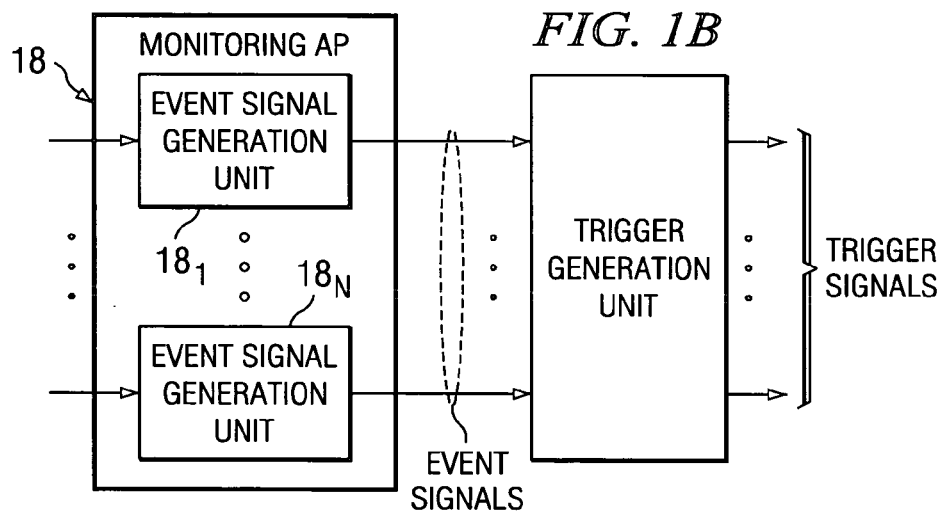
FIG. 1B illustrates the generation of trigger signals.

FIG. 1A and FIG. 1B have been discussed with respect to the related art.

Figure 2:
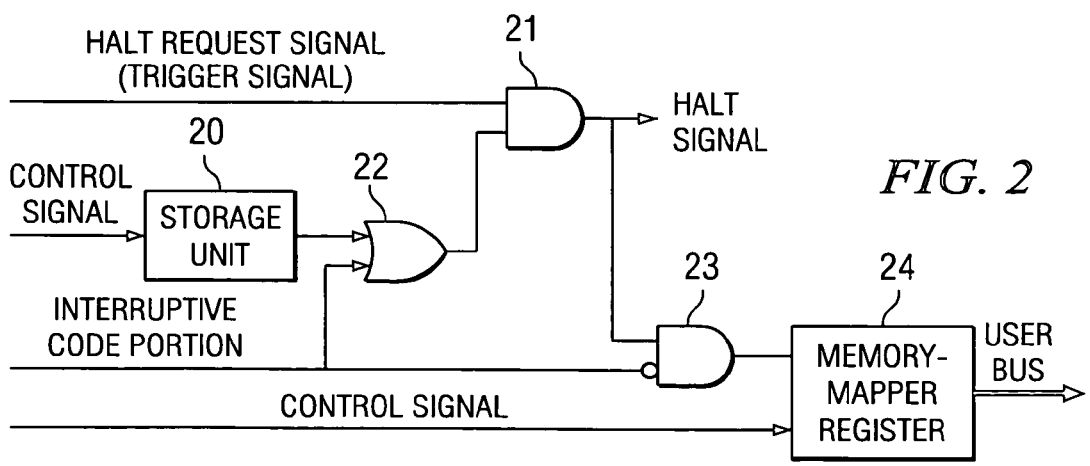
FIG. 2 is a block diagram of the apparatus for forwarding a halt signal during a non-interruptible code execution portion in a non-protected pipeline according to the present invention.

Referring to FIG. 2, the apparatus for selectively halting code execution in a processor having a non-protected pipeline is shown. Storage unit 20 has a CONTROL signal applied thereto. When the CONTROL signal is stored in the storage unit 20, a signal is applied to a first terminal of logic OR gate 22. A second terminal of logic OR gate 22 has a signal indicating whether the executing code is currently in an interruptible or in a non-interruptible code portion. The output terminal of logic OR gate 22 is coupled to a first input terminal of logic AND gate 21. A second terminal of logic AND gate 21 has a HALT REQUEST signal applied thereto. A HALT signal is generated at the output terminal of logic AND gate 21. The halt signal from logic AND gate 21 is applied to a first input terminal of logic AND gate 23. A second input terminal of logic AND gate 23 has applied thereto a signal indicating that the presently executing code portion is non-interruptible. The output signal from logic AND gate 23 is applied to a memory-mapped register bit position 24 setting a non-returnable bit. In response to a control signal, the contents of the non-returnable memory-mapped bit position 24 is applied to a read bus for transfer to the host processing unit.

Referring to FIG. 3, a flow chart illustrating the operation of the present invention is shown. In step 301, the target processing unit is reset and program execution begun. In step 302, a determination is made whether a halt signal has been generated. The code execution proceeds unit a halt is identified. A determination is made whether the halt occurs during a non-interruptible code portion in step 303. When the halt does not occur during an interruptible code portion, then, in step 304, the procedure resulting from the halt is implemented. When the procedure resulting from the halt is complete, in step 305 a return to the code execution is performed and the procedure returns to step 302. When the determination is made in step 303 that the halt signal occurs during a non-interruptible portion of the code, a non-returnable bit is set in step 306. In step 307, the beginning of halt procedure execution is monitored and when the halt execution procedure begins, the non-returnable bit is cleared in step 308. In step 309, the halt execution procedure is continued until the procedure is completed. Then the process returns to step 301 wherein the target processor is reset.

2. Operation of the Preferred Embodiment

The operation of the present invention can be understood as follows. In a processing system having a non-protected pipeline, when a CONTROL signal is not stored in the storage unit 20 and a HALT REQUEST signal is applied to the second terminal of the logic AND gate 21, then a HALT signal will be applied to the output terminal of logic AND gate 21 only when a positive INTERRUPTIBLE CODE PORTION signal is applied to the second input terminal of logic OR gate 22. When the INTERRUPTIBLE CODE PORTION signal and the CONTROL signal are not present, then the HALT REQUEST signal will not result in a HALT signal. However, when the CONTROL signal is stored in storage unit 20, a CONTROL signal is applied to an input terminal of logic OR gate 22 and a signal is applied to the first input terminal of logic AND gate 21. In this situation, a HALT REQUEST signal will provide a HALT signal whether the INTERUPTIBLE CODE PORTION signal is present or not.

In this manner, a HALT signal can be generated even when a non-interruptible code portion is being executed. Furthermore, the code execution in a non-interruptible code portion is determined by the storage of the CONTROL signal in the storage unit. Therefore, the generation of a HALT REQUEST signal is under the control of the user testing or debugging the target processor. The presence of both a halt signal and a non-interruptible code portion results in a non-returnable bit being stored in a memory-mapped register. The presence of the non-returnable bit is stored in a memory-mapped register and is therefore accessible to the host processing unit. The presence of the non-returnable bit alerts the host processing unit/user that the halt has corrupted the procedure during which the halt was generated and the procedure can not be restarted at that point.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. In a processing system having an unprotected pipeline, an apparatus comprising:
   a first logic gate for providing a first signal when a halt signal and a non-interruptible code signal occur together, and
   a memory unit for storing the first signal, the first signal indicating a non-returnable interruption of the executing procedure.

2. The apparatus as recited in claim 1 wherein the firs signal is transferred to a read bus.

3. The apparatus as recited in claim 1 wherein the memory unit is a memory-mapped register location.

4. The apparatus as recited in claim 1 wherein the first logic gate is a logic AND gate.

5. The apparatus as recited in claim 1 further comprising:
   a second logic gate, and
   a memory unit, the second logic gate providing a halt signal when a trigger signal is applied to a first input terminal and the contents of the memory unit are applied to a second input terminal.

6. A method for transferring a halt signal when a halt signal occurs during a non-interruptible portion of the executing code of a processor having a non-protected pipeline, the method comprising:

determining when a halt signal occurs during a non-interruptible portion of the executing code, and storing a non-returnable bit in a memory location accessible to testing device.

7. The method as recited in claim 6 wherein, when the control signal is applied to the memory location, applying the non-returnable bit to a read bus.

8. The method as recited in claim 7 wherein the memory unit is a memory-mapped register.

9. A data processing unit comprising: a processor, the processor including:

a non-protected pipeline, the processor executing interruptible code and non-interruptible code;

an event signal generating unit, the event signal generating unit generating an event signal in response to a halt condition;

a logic unit responsive to the halt condition and a control signal for generating a halt trigger signal during a non-interruptible code portion; and a storage unit for storing a non-returnable bit in response to the trigger halt signal.

10. The processing unit as recited in claim 9 wherein the storage unit is a memory-mapped register, the memory mapped register responsive to a control signal for transferring the non-returnable bit outside of the processor.

11. The processing unit as recited in claim 10 further including a storage unit, the storage unit storing an first signal when the processing unit is executing non-interruptible code, the first signal stored in the storage unit providing the control signal.

* * * * *